Patented July 19, 1949

2,476,549

UNITED STATES PATENT OFFICE 2,476,549

2-[VINYL-DICARBOXYLIC ACID ESTER]-3-AMINO-1,2,4-TRIAZOLES AND PROCESS OF PREPARING THE SAME

Newton Heimbach and Walter Kelly, Jr., Binghamton, N. Y., assignors to General Aniline & Film Corporation, New York, N. Y., a corporation of Delaware No Drawing. Original application October 22, 1946, Serial No. 704,934. Divided and this application December 7, 1946, Serial No. 714,906

8 Claims. (Cl. 260—308)

This invention relates to 2-[vinyl-dicarboxylic acid ester]-3-amino-1,2,4-triazoles, and to a method of preparing the same.

It is known in the art that light-sensitive emulsions, such as gelatin silver-halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light, and yellow or red by transmitted light. The so-called chemical, or gray fog, on the other hand, is the more common and is formed in a number of ways. It may be caused by premature exposure, by excessive ripening of the emulsions, or by the storage of the film, particularly at high temperatures or for unusually long periods of time.

It is an object of the present invention to provide 2-[vinyl-dicarboxylic acid ester]-3-amino-1,2,4-triazoles useful as stabilizers for silver-halide emulsions.

Another object of this invention is to provide a process of preparing such 2-[vinyl-dicarboxylic acid ester]-3-amino-1,2,4-triazoles.

A further object is to provide 2-[vinyl-dicarboxylic acid ester]-3-amino-1,2,4-triazoles as stabilizers or fog inhibiting agents which tend to prevent the formation of chemical fog in light-sensitive silver-halide emulsions.

A still further object is to provide 2-[vinyl-dicarboxylic acid ester]-3-amino-1,2,4-triazoles as stabilizers or anti-fogging agents for light-sensitive silver-halide emulsions, which do not lower the sensitivity of the emulsion, and which increase its stability.

Still further objects and advantages will appear from the following specification.

We have found that the above objects are accomplished by condensing an alkoxymethylene malonic ester with a 3-amino-1,2,4-triazole. The resulting condensation product is characterized by a structure corresponding to the following general formula:

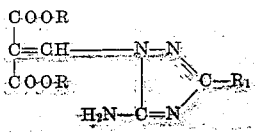

wherein R is an alkyl group, e. g., methyl, ethyl, propyl, butyl, and the like, and $R_1$ is hydrogen or an alkyl group of the same value as R.

The method for the preparation of 2-[vinyl-dicarboxylic acid ester]-3-amino-1,2,4-triazoles consists of condensing 1 mol of an alkoxymethylene malonic ester, of the following general formula:

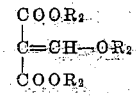

wherein $R_2$ is of the same value as R, with 1 mol of 3-amino-1,2,4-triazole of the following general formula:

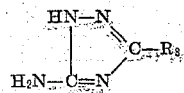

wherein $R_3$ is of the same value as $R_1$.

Suitable alkoxymethylene malonic esters are, for example, methyl methoxymethylene malonate, ethyl methoxymethylene malonate, methyl ethoxymethylene malonate, ethyl ethoxymethylene malonate, propyl ethoxymethylene malonate, ethyl propoxymethylene malonate, methyl butoxymethylene malonate, and the like.

As suitable 3-amino-1,2,4-triazoles may be mentioned, 3-amino-1,2,4-triazole, 3-amino-5-methyl-1,2,4-triazole, 3-amino-5-ethyl-1,2,4-triazole, 3-amino-5-propyl-1,2,4-triazole, 3-amino-5-isopropyl-1,2,4-triazole, and the like.

The condensation between the alkoxymethylene malonic ester and the 3-amino-1,2,4-triazole is carried out by allowing the reaction components to stand at room temperature with occasional shaking, in the presence of an alcohol-water mixture, for a period of time ranging from 1 to 3 days. The product either precipitates, or is removed by evaporation of the solvent mixture at room temperature.

The final product is recrystallized from either alcohol or boiling water. During the condensation reaction the hydrogen atom on the secondary nitrogen of the triazole, and the alkoxy group of the alkoxymethylene malonic ester split out with the formation of an alcohol.

As examples of suitable alcohols, which may be used as solvents for the condensation reaction and in recrystallizing the final product, may be mentioned, methyl alcohol, ethyl alcohol, propyl alcohol, isopropyl alcohol, and the like.

The alkoxymethylene malonic ester and the 3-amino-1,2,4-triazole are well-known to the art and the method for their preparation need not be described herein.

Specific compounds which have been prepared in accordance with the above procedures, with their formulas, are as follows:

(1) 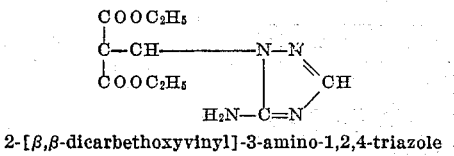

2-[β,β-dicarbethoxyvinyl]-3-amino-1,2,4-triazole (2) 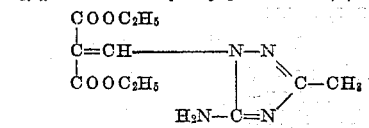

2-[β,β-dicarbethoxyvinyl]-3-amino-5-methyl-1,2,4-triazole (3) 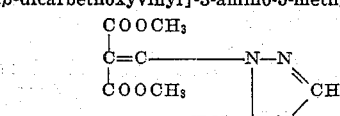

2-[β,β-dicarbomethoxyvinyl]-3-amino-1,2,4-triazole (4) 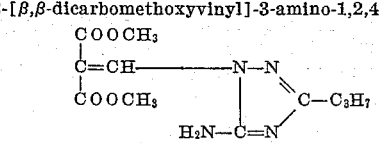

2-[β,β-dicarbomethoxyvinyl]-3-amino-5-propyl-1,2,4-triazole

The following examples are intended to illustrate the preparation of the compounds disclosed above. It will be appreciated that the conditions of reactions, e. g., time of reaction and temperature, may be varied, and that the supplementary process of purification may be resorted to wherever found desirable.

*Example I*

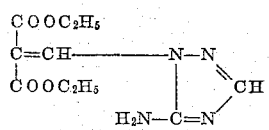

2-[β,β-dicarbethoxyvinyl]-3-amino-1,2,4-triazole

To a mixture of 30 cc. of ethanol and 15 cc. of water, 0.1 mol (8.4 grams) of 3-amino-1,2,4-triazole and 0.1 mol (21.6 grams) of ethyl ethoxymethylene malonate were added and the mixture allowed to stand at room temperature for 2 days with occasional shaking. The solvent of the reaction mixture was evaporated at room temperature. A thick colorless oil was obtained which crystallized slowly in the course of a week. The oil was diluted with ether and the crystalline product filtered off and recrystallized from boiling water.

*Example II*

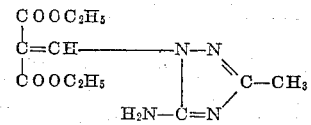

2-[β,β-dicarbethoxyvinyl]-3-amino-5-methyl-1,2,4-triazole

To a mixture of 15 cc. of ethanol and 3 cc. of water, 0.05 mol (4.9 grams) of 3-amino-5-methyl-1,2,4-triazole and 0.05 mol (10.8 grams) of ethyl ethoxymethylene malonate were added and the mixture allowed to stand at room temperature for 2 days. The solvent of the reaction mixture was evaporated off at room temperature and the product dissolved in ethanol, filtered, and recrystallized from ethanol.

*Example III*

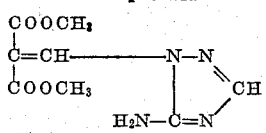

2-[β,β-dicarbomethoxyvinyl]-3-amino-1,2,4-triazole

To a mixture of 20 cc. of ethanol and 5 cc. of water, 0.05 mol (4.2 grams) of 3-amino-1,2,4-triazole and 0.05 mol (9.4 grams) of methyl ethoxymethylene malonate were added and the mixture allowed to stand at room temperature for 1 day. The white product which slowly crystallized out was filtered, washed with ether, and recrystallized from boiling water.

In the preparation of emulsions containing the stabilizers as above prepared, a solution of the stabilizer in a suitable solvent, such as alcohol or an alcohol-water mixture, adjusted to a neutral or slightly alkaline pH, i. e., pH 7.5 to 10, is made up and the solution mixed with the emulsion at any point during its preparation, but preferably during ripening or just prior to coating in concentrations varying from 25 mg. to 500 mg. per liter of emulsion. The actual concentration employed will depend upon the type of emulsion used, and may vary somewhat with the particular compound employed.

The method of testing the stabilizers employed in the following examples consists of coating two film strips, such as cellulose acetate, with the same emulsion, one with and one without stabilizer, storing the emulsions in an incubator for six days at 50° C., then exposing, developing, fixing, and washing the same under standard conditions. The fog density or blackening produced in the unexposed areas in the two emulsions is then measured in a transmission densitometer of standard type.

The following examples will serve to illustrate certain ways in which the 2-[vinyl-dicarboxylic acid ester]-3-amino-1,2,4-triazoles, of our invention, are applied as stabilizers for silver-halide emulsions, but are not to be construed as limiting the invention.

*Example IV*

A photographic film coated with an ordinary gelatin-bromoiodide emulsion of normal speed and contrast on development under standard conditions, after incubation for six days at 50° C., gave a fog of 0.28 density. Another film coated with the same emulsion containing an addition of 100 mg. of the compound of Example I per 1000 cc. of emulsion, equivalent to about 50 grams of silver-halide, and developed under the same conditions, after the same incubation, gave a fog of only 0.06 density.

*Example V*

Example IV was repeated with the exception that an equivalent quantity of the compound of Example II was substituted for the compound of Example I. The results obtained were almost identical with those obtained in Example IV.

*Example VI*

Example IV was again repeated with the exception that 75 mgs. of the compound of Example III were substituted for 100 mgs. of the compound of Example I. After incubation and development, the emulsion containing the compound of Example III gave a fog of only 0.1.

Further experiments have shown that emulsions containing stabilizers in accordance with our invention have not only improved keeping qualities (i. e., a reduction in the fog produced by incubation or by long storage), but in addition do not effect changes in speed to which some emulsions are susceptible.

The stabilizers which we have prepared and employed may be used in various kinds of emulsions. In addition to being useful in orthochromatic and panchromatic emulsions, they may also be employed in non-sensitized emulsions and X-ray emulsions. If used with sensitizing dyes they may be added to the emulsion before or after the dyes are added. The dispersing agents for the silver-halides may be gelatin or other colloid such as water-soluble cellulose derivatives, e. g., hydroxy ethyl cellulose, methyl cellulose, carboxy-oxy-cellulose, low acetyl value cellulose acetate, and the like. The stabilizers may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives, e. g., cellulose nitrate, cellulose acetate, the lower fatty acid esters of cellulose including simple and mixed esters, ethers of cellulose, and the like, as an overcoat for the emulsion, or as a backing layer for the support. Moreover, they may be incorporated in the support for the sensitive emulsion layer or in an intermediate layer between the sensitive emulsion layer and the support, such as the baryta coating commonly used in photographic papers. Again, the otherwise finished photographic material may be bathed in an alcohol or alcohol-water solution containing the stabilizer.

This application is a division of our co-pending application Serial No. 704,934, filed on October 22, 1946, now U. S. Patent 2,449,226.

Various modifications of this invention will occur to persons skilled in the art and it is, therefore, understood that the patent granted shall only be limited by the appended claims.

We claim:

1. A chemical compound of the general formula:

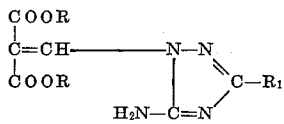

wherein R is an alkyl group of not more than four carbon atoms, and $R_1$ is a member selected from the class consisting of hydrogen and an alkyl group of not more than four carbon atoms.

2. A chemical compound corresponding to the formula:

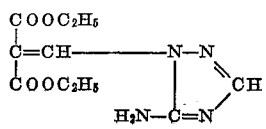

3. A chemical compound corresponding to the formula:

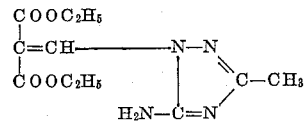

4. A chemical compound corresponding to the formula:

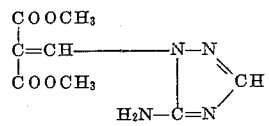

5. The process of producing 2-[vinyl-dicarboxylic acid ester] - 3 - amino - 1,2,4 - triazoles, which comprises treating 1 mol of a compound of the general formula:

with 1 mol of the general formula:

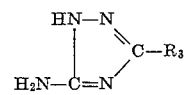

wherein $R_2$ is an alkyl group of not more than four carbon atoms and $R_3$ is a member selected from the class consisting of hydrogen and an alkyl group of not more than four carbon atoms in the presence of an alcohol-water mixture at room temperature, for a period of time ranging from 1 to 3 days.

6. The process which comprises treating 1 mol of ethyl ethoxymethylene malonate with 1 mol of 3-amino-1,2,4-triazole in the presence of an alcohol-water mixture at room temperature, for a period of time ranging from 1 to 3 days.

7. The process which comprises treating 1 mol of ethyl ethoxymethylene malonate with 1 mol of 3-amino-5-methyl-1,2,4-triazole in the presence of an alcohol-water mixture at room temperature, for a period of time ranging from 1 to 3 days.

8. The process which comprises treating 1 mol of methyl ethoxymethylene malonate with 1 mol of 3-amino-1,2,4-triazole in the presence of an alcohol-water mixture at room temperature, for a period of time ranging from 1 to 3 days.

NEWTON HEIMBACH.
WALTER KELLY, Jr.

REFERENCES CITED

The following references are of record in the file of this patent:

UNITED STATES PATENTS

| Number | Name | Date |
|---|---|---|
| 2,233,805 | Brodersen | Mar. 4, 1941 |